2,958,756

GAS-SHIELDED METAL-ARC WELDING

Donald M. Yenni, Williamsville, and Kenneth L. Thomas, Kenmore, N.Y., assignors to Union Carbide Corporation, a corporation of New York No Drawing. Filed Jan. 13, 1954, Ser. No. 403,934

8 Claims. (Cl. 219—74)

This invention relates to gas-shielded metal-arc welding and, more particularly, to shielded-inert-gas-metal-arc or sigma welding with relatively high-current density like that proposed by Muller et al. No. 2,504,868 and Kennedy 2,532,410.

Generally, in sigma welding the shielding gas is argon or helium. Recently, as disclosed in the application of R. T. Breymeier, Serial No. 210,397, filed February 10, 1951, in sigma welding carbon steel, it has been found beneficial to use argon containing some oxygen such as 2–5%. It has also been proposed to use a mixture of helium and argon, Patent No. 2,591,926, as the shielding gas for non-consumable or refractory metal electrode arc welding in which the electrode is tungsten or thoriated tungsten. But it is impossible to predict beforehand that such proposal for refractory-electrode inert gas-shielded arc welding would be suitable also for gas-shielded consumable electrode metal-arc welding.

In an investigation of various shielding gases and gas mixtures for high-current density sigma welding of carbon steel, we have discovered that wholly unexpected improvements in arc stability and weld bead shape are obtained with a shielding gas consisting of helium, argon and oxygen. For example, a shielding gas composed of a mixture of 67% helium, 31.5% argon and 1.5% oxygen produces a quiet, spatter-free arc, resulting in a very smooth weld bead deposit. We have established that for sigma welding carbon steel, the most suitable shielding gas is one composed of 60% helium and 39% argon and 1% oxygen. Satisfactory results are obtainable when the shielding gas consists of up to 3% oxygen, 40 to 70% helium and the balance argon for sigma welding carbon steel with direct current reverse polarity (DCRP).

According to our invention in the case of sigma welding carbon steel with direct current straight polarity (DCSP), the shielding gas should be relatively dry and contain from 3 to 5% commercially pure oxygen, 70% commercially pure helium and the balance commercially pure argon.

Most of the following performance data were secured in sigma welding single pass beads on one-quarter inch thick carbon steel plate with an electrode of one-sixteenth inch diameter welding wire which is sold by the Linde Air Products Company as No. 32 CMS. Such wire contains about 0.12% carbon, 1.00–1.20% manganese, 0.25% silicon, 0.36% chromium, not more than 0.015% sulphur, and the balance iron.

Data are given in Table I below for sigma welding operations using various helium-argon mixtures and helium-argon-oxygen mixtures containing 1, 3 and 5% oxygen. Data obtained with argon, helium, 5% oxygen-95% helium, and 5% oxygen-95% argon mixtures are included for comparison. Beads were made at 25 and 50 i.p.m. with direct current-reverse polarity and at 25 i.p.m. with direct current-straight polarity power. A welding speed of 25 i.p.m. was selected since this representts the maximum speed for producing acceptable welds on ¼ inch thick steel plate with pure argon and is also about the maximum speed for hand welding methods. Although arc current was substantially constant (350 amperes) for a given welding speed and polarity, some changes will be noticed in arc operating voltage. The voltage for most satisfactory operation with each shielding gas mixture was selected.

The test beads were intended to have penetration somewhat greater than half the plate thickness or 0.125 inch, and a bead width-to-height ratio of four or more. A desirable dilution is 50% or greater. Dilution is the ratio of melted base metal area to total melted area on the bead cross-section. These conditions apply to double pass, square butt welding.

TABLE I

(Part I)

| Weld No. | He, percent | Shielding Gas Composition | | | Wire Feed Rate, i.p.m. | Ht., In. | Penet., In. | Width, In. | W/H |
|---|---|---|---|---|---|---|---|---|---|
| | | A, percent | O₂, percent | Arc D.C.-R.P., Volts | | | | | |
| 83 | 0 | 100 | 0 | 27 | 215 | .110 | .145 | .390 | 3.5 |
| 80 | 40 | 60 | 0 | 30 | 220 | .105 | .170 | .425 | 4.0 |
| 81 | 60 | 40 | 0 | 28 | 260 | .080 | .150 | .510 | 6.4 |
| 84 | 100 | 0 | 0 | 32 | 285 | .095 | .165 | .550 | 5.8 |
| 82 | 0 | 95 | 5 | 27 | 215 | .070 | .130 | .480 | 6.9 |
| 85 | 95 | 0 | 5 | 29 | 255 | .080 | .210 | .600 | 7.5 |
| 93 | 25 | 74 | 1 | 28 | 165 | .080 | .125 | .515 | 6.4 |
| 92 | 40 | 59 | 1 | 28 | 185 | .070 | .125 | .525 | 7.5 |
| 59 | 50 | 49 | 1 | 28 | 185 | .080 | .120 | .500 | 6.3 |
| 60 | 60 | 39 | 1 | 28 | 200 | .085 | .130 | .500 | 5.9 |
| 61 | 70 | 29 | 1 | 30 | 210 | .080 | .140 | .520 | 6.5 |
| 32 | 80 | 19 | 1 | 31 | 235 | .075 | .170 | .560 | 7.5 |
| 94 | 25 | 72 | 3 | 28 | 165 | .070 | .125 | .500 | 7.2 |
| 95 | 40 | 57 | 3 | 28 | 185 | .070 | .110 | .470 | 6.7 |
| 58 | 50 | 47 | 3 | 28 | 190 | .070 | .120 | .495 | 7.1 |
| 57 | 60 | 37 | 3 | 28 | 200 | .070 | .125 | .495 | 7.1 |
| 56 | 70 | 27 | 3 | 28 | 210 | .080 | .145 | .480 | 6.0 |
| 53 | 50 | 45 | 5 | 28 | 225 | .070 | .135 | .490 | 7.0 |
| 54 | 60 | 35 | 5 | 28 | 230 | .075 | .140 | .495 | 6.6 |
| 55 | 70 | 25 | 5 | 28 | 235 | .070 | .150 | .505 | 7.2 |

TABLE I
(Part II)

| Weld No. | Area Sq. In. | Dilution, Percent | Spatter | Surface Condition |
|---|---|---|---|---|
| 83 | .055 | 44 | None | Rippled. |
| 80 | .061 | 50 | Medium | Do. |
| 81 | .083 | 57 | Bad | Do. |
| 84 | .099 | 59 | do | Smooth except for spatter. |
| 82 | .065 | 53 | None | Rippled. |
| 85 | .087 | 57 | Bad | Do. |
| 93 | .053 | 45 | None | Do. |
| 92 | .051 | 48 | do | Smooth. |
| 59 | .050 | 44 | do | Do. |
| 60 | .055 | 50 | do | Do. |
| 61 | .061 | 54 | do | Do. |
| 32 | .088 | 65 | Medium to bad. | Some spatter. |
| 94 | .056 | 50 | None | Scale, puddle boils. |
| 95 | .054 | 50 | do | Do. |
| 58 | .059 | 49 | do | Do. |
| 57 | .062 | 52 | do | Do. |
| 56 | .068 | 55 | do | Do. |
| 53 | .065 | 57 | do | Do. |
| 54 | .071 | 58 | do | Do. |
| 55 | .077 | 60 | do | Do. |

Base plate=¼ in. C.R. steel (killed).
Desired penetration >0.125 in.
Filler Wire=32 CMS ¹⁄₁₆-in. diameter.
Gas flow=100 c.f.h. total through a #12 (¾ in. inside diameter) gas cup.
Arc current=350 amperes—D.C.
All data taken from weld beads—one pass.

The weld results in the first group of Table I indicate clearly the improvement in bead cross-section obtained by the addition of helium to argon. This is shown by increased ratio of bead width to height and, while omitted from Table I, by increased dilution. Equally satisfactory bead cross-sections are obtained with 5% oxygen-95% argon, and with 5% oxygen-95% helium. The 5% oxygen-helium mixture is not satisfactory, however, because of excessive spatter and poor arc stability; nor is the arc in the $O_2$—$A_2$ mixture as stable as in the ternary mixture. Spatter difficulties are also encountered using helium-argon mixtures with helium concentrations of 60% and more.

Performance with various argon-helium ratios and oxygen concentrations of 1, 3 and 5% are shown in third, fourth and fifth groups of welds in Table I. Dilution and bead width-to-height ratio show that most of these welds have satisfactory cross-sections. Arc operation with such mixtures is remarkably stable and little spatter is experienced with any helium-argon-oxygen mixture containing 70% helium or less. Thus, the addition of oxygen to helium-argon mixture increases arc stability and reduces spatter. Smoothness of weld surface and arc stability are considerably better than that of comparable beads made with oxygen-argon. The increased arc stability and smoothness of operation make the use of helium-argon-oxygen mixtures ideal for hand sigma welding operations, where high welding speeds are not required.

According to our invention the best shielding gas compositions for use under established sigma welding conditions should contain 1% oxygen, from 40 to 70% helium and the remainder argon, such as the weld made with 1% oxygen-70% helium-29% argon. This weld may be compared with the weld made under similar operating conditions with oxygen-argon. Stable arc behavior and smooth weld bead surface are also secured using shielding gas compositions with 3% and 5% oxygen. The higher oxygen concentrations are not as satisfactory because of increased oxidation of the weld surface. The data in Table I show an increase in penetration and melted metal area with increasing helium concentration in the shielding gas.

Addition of 5% oxygen to pure argon increased dilution, improved bead cross-section and increased arc stability. Similar improvements, however, are not obtained by adding 5% oxygen to pure helium. Arc stability and spatter remain essentially constant with no change in dilution. Increased penetration and a greater ratio of weld width-to-height are secured.

Butt welds were made using two-pass technique on prepared 60° double-V, sharp-nose plates and on square-edged plates. As found in the past, sigma welding behavior under actual welding conditions correlated well with results of bead tests. The welds were made on ¼" thick steel plates at a speed of 25 i.p.m. using ¹⁄₁₆" diameter No. 32 CMS wire. For reverse polarity welds the shielding gas was obtained from a cylinder of pre-mixed gases containing 53% helium, 46% argon and 1% oxygen. Since higher concentrations of oxygen are desirable with straight polarity, the shielding gas mixture used for making the straight polarity welds was 70% helium, 25% argon and 5% oxygen.

Results of several welds under various conditions are listed below. Satisfactory ductility is indicated by the elongation in the bend test and radiographs showed no porosity. As in the weld beads, unusually good arc stability was encountered during welding and the finished welds were smooth and regular. The cross-section of the welds showed satisfactory dilution, a desirable ratio of nugget width-to-height and generally desirable shape.

WELDING CONDITIONS

| Plate Edge Preparation | 1st Pass | | 2nd Pass | | Polarity | Bend Test-Elongation, Percent |
|---|---|---|---|---|---|---|
| | Amp. | Volts | Amp. | Volts | | |
| 60° Double Vee-tight joint | 300 | 28 | 330 | 28 | DCRP | 35 |
| Square Butt-tight joint | 350 | 28 | 350 | 28 | DCRP | 40 |
| 60° Double Vee-tight joint | 350 | 26 | 390 | 27 | DCSP | 30 |

TABLE II

DCSP—25 i.p.m. welding speed

| Weld No. | Shielding Gas Composition | | | Arc | | Wire Feed Rate, i.p.m. | Ht., In. | Penet., In. | Width, In. | W/H |
|---|---|---|---|---|---|---|---|---|---|---|
| | He, Percent | A, Percent | $O_2$, Percent | Amp. | Volts | | | | | |
| 88 | 0 | 100 | 0 | 350 | 30 | 330 | .115 | .050 | .600 | 5.2 |
| 91 | 40 | 60 | 0 | 335 | 32 | 335 | .115 | .045 | .490 | 4.2 |
| 90 | 60 | 40 | 0 | 330 | 33 | 320 | .105 | .030 | .495 | 4.7 |
| 87 | 100 | 0 | 0 | 335 | 32 | 330 | .095 | .060 | .590 | 6.2 |
| 89 | 0 | 95 | 5 | 350 | 29 | 300 | .100 | .070 | .450 | 4.5 |
| 86 | 95 | 0 | 5 | 350 | 48 | 375 | .125 | .100 | .500 | 4.0 |
| 63 | 50 | 49 | 1 | 330 | 30 | 370 | .165 | .045 | .315 | 1.9 |
| 62 | 70 | 29 | 1 | 350 | 27 | 430 | .135 | .045 | .455 | 3.4 |
| 64 | 50 | 47 | 3 | 350 | 28 | 350 | .130 | .080 | .405 | 3.1 |
| 65 | 70 | 27 | 3 | 350 | 28 | 330 | .105 | .080 | .430 | 4.1 |
| 67 | 50 | 45 | 5 | 350 | 28 | 330 | .100 | .095 | .440 | 4.4 |
| 66 | 70 | 25 | 5 | 350 | 28 | 330 | .100 | .105 | .485 | 4.8 |

DCSP—25 i.p.m. welding speed

| Weld No. | Area Sq. In. | Dilution, Percent | Spatter | Bead Condition |
|---|---|---|---|---|
| 88 | .049 | 33 | Bad | Irregular, shallow. |
| 91 | .057 | 30 | ...do | Do. |
| 90 | .050 | 28 | ...do | Slightly uniform, very shallow. |
| 87 | .051 | 37 | ...do | Regular, edges scalloped. |
| 89 | .049 | 33 | ...do | Slightly uniform, shallow. |
| 86 | .064 | 42 | ...do | Do. |
| 63 | .056 | 20 | Medium | High and narrow. |
| 62 | .061 | 25 | ...do | Smooth, penetration inadequate. |
| 64 | .064 | 36 | ...do | Uniform but high. |
| 65 | .065 | 41 | ...do | Uniform. |
| 67 | .072 | 45 | ...do | Do. |
| 66 | .074 | 43 | ...do | Do. |

Desired penetration >0.125 in.
Base plate=¼-in. C.R. steel (killed).
Filler wire=32 CMS ¹⁄₁₆-in. diameter.
Gas flow=100 c.f.h. total through a #12 (¾ inch inside diameter) gas cup
All data taken from weld beads—one pass.

Although all of the straight polarity welds lacked penetration, use of helium-argon-oxygen mixtures containing 5% oxygen yielded beads with somewhat greater dilution and penetration than that of beads shielded with 5% oxy-argon. Spatter was present but not as bad as that observed with 5% oxygen-argon arc shielding gas. These comments are based on data in Table II comparing welds No. 66 and 67 with weld No. 89. Beads made with helium-argon, helium-oxygen, 5% oxy-argon, and pure argon had little penetration, poor cross-section shape, bad spatter and erratic arc behavior.

Tabulated below is information secured with motion pictures of sigma welding with some of the shielding gas mixtures discussed in this report. The pictures were taken at 10,000 frames per second on weld beads made on ¼-inch thick steel plate at 25 i.p.m. using ¹⁄₁₆ inch No. 32 CMS welding wire with reverse polarity direct current as indicated in Table I. The photographs showed a stable arc in the pure argon, the argon-oxygen and the helium-argon-oxygen shielding gas mixtures, confirming visual observations and correlating with spatter formation. Furthermore, the metal transfer drop rate was much higher in the stable arcs. Arc shape varied from a ball or cylindrical geometry in helium and helium-oxygen shielding gas to a cone or trumpet in argon, sigma argon and helium-argon-oxygen. The estimated area of coverage on the base plate by the intermediate arc zone is listed in order of increasing size: helium, helium-oxygen, argon, sigma argon, helium-argon-oxygen.

TABLE III

| Shielding Gas Composition | | | Spatter | Arc Behavior | Metal Transfer, Drops/Sec. | Wire Feed Rate, i.p.m. |
|---|---|---|---|---|---|---|
| He | A | $O_2$ | | | | |
| | 100 | | None | Stable, cone-shaped arc. | 150 | 215 |
| 100 | | | Bad | Erratic ball-shaped arc; occasional shorting. | 25–50 | 285 |
| 95 | | 5 | Bad | Cylindrical shape, erratic. | 40–60 | 255–310 |
| | 95 | 5 | None | Stable, cone-shaped arc; frequent ballooning of drops. | 300 | 215–250 |
| 70 | 29 | 1 | None | Stable, trumpet-shaped arc, shorter than 5% oxygen-argon gas-shielded arc. | 400 | 210–240 |

The minimum operating current for a stable arc with a given welding rod and shielding gas are important commercially and can be determined visually by observing the current at which individual drops appear in the arc. At this point, unstable arc performance generally appears. Observations were made with various combinations of shielding gas using ¹⁄₁₆″ diameter No. 32 CMS wire with direct current reverse polarity and an arc shielding gas flow rate of 100 c.f.h. The data summarized below show that mixtures, of argon-helium-oxygen are almost as effective as arc shielding gas containing 5% oxygen and the balance argon, in lowering the minimum operating current.

TABLE IV

| Shielding Gas Composition | | | Current at Which Arc Became Erratic (Amperes) | Arc Potential, Volts |
|---|---|---|---|---|
| He | Argon | $O_2$ | | |
| 100 | 0 | 0 | 370 | 32 |
| 0 | 100 | 0 | 280–300 | 28 |
| 0 | 95 | [1] 5 | 210–220 | 28 |
| 95 | 0 | 5 | 280–310 | 30 |
| 70 | 30 | 0 | 250–260 | 28 |
| 40 | 60 | 0 | 240–260 | 28 |
| 70 | 29 | 1 | 230 | 28 |
| 50 | 49 | 1 | 250 | 28 |
| 70 | 25 | 5 | 240–250 | 28 |
| 50 | 45 | 5 | 230–240 | 28 |

[1] (M-5).

According to our invention for sigma welding the oxy-argon-helium arc shielding gas mixture preferably should be relatively dry, i.e. contain not more than 10 grains of moisture per 1000 cubic feet and preferably less than 7 grains/1000 cubic feet.

The invention is equally suitable for welding stainless steel. For example, Table V below sets forth data obtained by sigma welding ¼ inch thick stainless steel (type 304) plates with ¹⁄₁₆ inch welding wire (type 304) at a welding speed of 25 inches per minute using DCPR welding current.

TABLE V
(Part I)

| Weld No. | Shielding Gas Composition | | | Arc | | Wire Feed Rate, i.p.m. | Weld Bead Measurement | | | |
|---|---|---|---|---|---|---|---|---|---|---|
| | He, Percent | A, Percent | $O_2$, Percent | Volts | Amps | | Ht., In. | Penet., In. | Width, In. | W/H |
| 39 | 70 | 29 | 1 | 28 | 350 | 215 | .090 | .250 | .570 | 6.3 |
| 40 | 83 | 16 | 1 | 27 | 320 | 215 | .085 | .210 | .540 | 6.4 |
| 41 | 100 | | | 37 | 270 | 175 | .070 | .120 | .640 | 9.1 |
| 42 | | 100 | | 27 | 305 | 200 | .090 | .135 | .640 | 7.1 |
| 43 | | 95 | 5 | 27 | 305 | 205 | .095 | .180 | .500 | 5.3 |

TABLE V
(Part II)

| Weld No. | Area Sq. In. | Dilution, Percent | Spatter | Surface Condition |
|---|---|---|---|---|
| 39 | .094 | 56.5 | None | Excellent. |
| 40 | .080 | 62.5 | ...do | Do. |
| 41 | .080 | 55.0 | Medium | Fair. |
| 42 | .085 | 50.6 | None | Do. |
| 43 | .079 | 53.2 | ...do | Do. |

Table V shows that welding according to the invention of stainless steel is quite satisfactory.

We claim:

1. A shielding gas for direct current straight polarity sigma welding of metal selected from the class consisting of carbon steel and stainless steel, composed of a relatively dry mixture containing 70% helium, 25% argon and 5% oxygen.

2. A shielding gas composition for direct current reverse polarity high-current density sigma welding of metal selected from the class consisting of carbon steel and stainless steel, consisting of 60% helium, 39% argon and 1% oxygen.

3. A shielding gas for sigma welding which is composed of a relatively dry mixture of oxygen, helium and argon, containing 40–70% helium, 1–5% oxygen, and the balance argon.

4. Process of gas-shielded metal-arc welding which comprises striking an arc between the work and a fusible metal electrode, feeding such electrode toward such work at a relatively rapid rate as molten metal is transferred therefrom to the work through such arc, and shielding the arc and adjacent metal with a gas stream consisting of a mixture containing 40–70% commercially pure helium, 1–5% commercially pure oxygen and the balance commercially pure argon.

5. Process as defined by claim 4, in which the work and electrode are composed of carbon steel.

6. Process as defined by claim 4, in which the work and electrode are composed of stainless steel.

7. A shielding gas for sigma welding stainless steel, which is composed of a mixture of 1% oxygen, 16–29% argon and the balance helium.

8. Sigma welding which includes the step of protecting the welding arc with a stream of gas consisting of a mixture of 1% oxygen, 16–29% argon and the balance helium.

References Cited in the file of this patent

UNITED STATES PATENTS

| | | |
|---|---|---|
| 2,504,867 | Muller | Apr. 18, 1950 |
| 2,504,868 | Muller et al. | Apr. 18, 1950 |
| 2,544,711 | Mikhalapov | Mar. 13, 1951 |
| 2,576,793 | Jordan | Nov. 27, 1951 |
| 2,591,926 | Gibson | Apr. 8, 1952 |

OTHER REFERENCES

"Arc Welding in Controlled Atmospheres," by Doan and Smith, pp. 110S–116S, in March 1940 Welding Research Supplement.